United States Patent
Tallinger et al.

(10) Patent No.: US 9,442,679 B2
(45) Date of Patent: Sep. 13, 2016

(54) NETWORK DISCOVERY USING UNICAST COMMUNICATIONS

(71) Applicant: Xerox Corporation, Norwalk, CT (US)

(72) Inventors: Douglas J. Tallinger, Penfield, NY (US); Yves G. Dufresne, Fairport, NY (US); Marcelo Hinojosa, Webster, NY (US); Robert E. Crumrine, Fairport, NY (US); Roger T. Kramer, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 236 days.

(21) Appl. No.: 13/755,082

(22) Filed: Jan. 31, 2013

(65) Prior Publication Data

US 2014/0214939 A1 Jul. 31, 2014

(51) Int. Cl.
*G06F 3/12* (2006.01)
*H04L 12/24* (2006.01)

(52) U.S. Cl.
CPC ........... *G06F 3/1218* (2013.01); *G06F 3/1226* (2013.01); *G06F 3/1285* (2013.01); *G06F 3/1291* (2013.01); *H04L 41/12* (2013.01); *G06F 3/1231* (2013.01)

(58) Field of Classification Search
CPC .............................. G06F 3/1285; H04L 67/12
USPC .......................... 709/203, 220, 224; 358/1.15
See application file for complete search history.

(56) References Cited

U.S. PATENT DOCUMENTS

| | | | |
|---|---|---|---|
| 5,185,860 A | 2/1993 | Wu | |
| 5,710,885 A | 1/1998 | Bondi | |
| 6,052,727 A | 4/2000 | Kamalanathan | |
| 6,269,400 B1 | 7/2001 | Douglas et al. | |
| 6,920,506 B2 * | 7/2005 | Barnard | H04L 29/12113 709/223 |
| 6,978,314 B2 * | 12/2005 | Tarr | 709/245 |
| 7,240,106 B2 | 7/2007 | Cochran et al. | |
| 7,606,880 B2 * | 10/2009 | Shima | 709/220 |
| 7,756,958 B2 | 7/2010 | Nagarajrao et al. | |
| 8,019,851 B2 | 9/2011 | Nagarajrao et al. | |
| 8,116,233 B2 | 2/2012 | Lambert et al. | |
| 8,166,199 B2 * | 4/2012 | Ogasawara | H04L 29/12273 709/220 |
| 8,693,392 B2 * | 4/2014 | Cooper et al. | 370/328 |
| 2003/0097425 A1 * | 5/2003 | Chen | H04L 29/06 709/220 |
| 2004/0223179 A1 * | 11/2004 | Mentze | H04L 29/06 358/1.15 |
| 2004/0249906 A1 * | 12/2004 | Olbricht et al. | 709/220 |
| 2004/0263898 A1 * | 12/2004 | Ferlitsch | G06F 3/1207 358/1.15 |
| 2005/0046886 A1 * | 3/2005 | Ferlitsch | G06F 3/1206 358/1.13 |

(Continued)

*Primary Examiner* — Backhean Tiv
(74) *Attorney, Agent, or Firm* — Gibb & Riley, LLC

(57) ABSTRACT

A first printer acquires a first network address from an external server using unicast (non-broadcast) transmissions. Then, second printers and an external computerized device also acquire the first network address from the external server, similarly using unicast transmissions. The second printers contact (e.g., say "hello" to) the first printer using a peer-to-peer network. The external computerized device contacts (again using unicast transmissions) the first printer using the first network address to cause the first printer to transmit a list of the second printers that have contacted the first printer to the external computerized device. The external computerized device then contacts (again using unicast transmissions) the second printers using the list of contacted printers (which includes network address information of the second printers) to allow the external computerized device to configure the second printers.

16 Claims, 5 Drawing Sheets

(56) References Cited

U.S. PATENT DOCUMENTS

| | | | |
|---|---|---|---|
| 2005/0052694 A1* | 3/2005 | Asano | G06F 21/31 358/1.15 |
| 2005/0162685 A1* | 7/2005 | Heiles | G06F 3/1206 358/1.15 |
| 2007/0139693 A1* | 6/2007 | Lodolo | 358/1.15 |
| 2008/0253667 A1* | 10/2008 | Shiraishi | 382/232 |
| 2009/0033976 A1* | 2/2009 | Ding | G06F 3/1288 358/1.15 |
| 2009/0116404 A1 | 5/2009 | Mahop et al. | |
| 2010/0121949 A1* | 5/2010 | Cho | 709/224 |
| 2013/0038897 A1* | 2/2013 | Heckler | H04L 67/16 358/1.15 |
| 2013/0141746 A1* | 6/2013 | Miller | G06F 3/1204 358/1.14 |
| 2013/0208620 A1* | 8/2013 | Kaufman et al. | 370/254 |
| 2014/0214939 A1* | 7/2014 | Tallinger | G06F 3/1218 709/204 |
| 2014/0250213 A1* | 9/2014 | Seki | G06K 15/4045 709/220 |

\* cited by examiner

NETWORK DISCOVERY USING UNICAST COMMUNICATIONS

BACKGROUND

Embodiments herein generally relate to discovery of devices connected to a network and to systems and methods that use printers (such as multi-function printer (MFPs)) in such networks and server devices outside such networks.

Network connected devices are often discovered by broadcasting messages to the entire network, and a list is made of all devices that respond to the broadcast. In computer networking, unicast transmissions involve the sending of messages to a single network destination identified by a unique address. Herein, the term "unicast" is used as shorthand to represent all forms of one-to-one communications between two computerized devices. The term unicast is contrasted with the term broadcast, which means transmitting the same data to all possible destinations. Unicast-based servers provide a unique stream for each unique user.

Common limitations of existing network discovery methods include excessive network traffic caused by broadcast or multicast messages and/or the scope of a broadcast message being limited to local subnet. Due to the relatively high network traffic caused by broadcast or multicast discovery methods, many enterprise customers disable the mobile Domain Name System (mDNS) packets that are used in some discovery methods. Further, some discovery methods require a server within each subnet visible to the server to enable cross subnet discovery. Other discovery methods send out multicast "hello" messages for discovery; however, such methods can be limited to the local subnet. Additional discovery methods send out Simple Network Managed Protocol (SNMP) queries to each Internet Protocol (IP) address in a user determined range. While these can cover multiple subnets, they generate significant network traffic.

SUMMARY

Exemplary methods herein begin with a first computerized printer (e.g., a multi-function printer (MFP)) providing its Internet Protocol (IP) address to a second network node (e.g., MFP) using unicast transmissions (non-broadcast, non-multicast transmissions). Then, one or more second computerized printers (e.g., second MFPs) transmit their IP address to the first network node (e.g., MFD). The second MFPs are connected to the server by a peer-to-peer network, and the second MFPs communicate with the DNS server using unicast transmissions. Unicast transmissions comprise messages sent to a single network destination identified by a unique address, and communications on the peer-to-peer network therefore comprise direct packet communications.

Additionally, in these methods, the second MFPs contact (transmit a "hello" to) the first MFP using the peer-to-peer network. This allows the first MFP to develop a list of second MFPs that have contacted the server using the peer-to-peer network (after the first MFP acquires the first IP address). The second MFPs are on the list of contacted MFPs, and the list of contacted MFPs includes network address information of the second MFPs.

Further, in these methods, a first computerized device (e.g., an external configuration server) acquires the first IP address from the DNS server after the first MFP acquires the first IP address. The external server and DNS server are connected to a wide area network (WAN, such as the Internet) outside the peer-to-peer network, and the external server communicates with the DNS server using unicast transmissions.

These methods continue where the external server contacts the first MFP using the first IP address to cause the first MFP to transmit the list of contacted MFPs to the external server. The external server communicates with the first MFP using unicast transmissions. The external server can then contact the second MFPs using the list of contacted MFPs to allow the external server to configure the second MFPs. The external server also communicates with the second MFPs using unicast transmissions.

Exemplary systems herein include a first computerized printer (such as a first MFP), one or more second computerized printers (such as second MFPs) connected to each other and to the first MFP by a peer-to-peer network, and an external computerized device (such as a external server) that is connected to a WAN outside the peer-to-peer network.

In this system, the first MFP acquires a first network (e.g., IP) address from a first (e.g., DNS) server using unicast (non-broadcast) transmissions. The second MFPs and the external server also acquire the first IP address from the DNS server after the first MFP acquires the first IP address. The second MFPs and the external server similarly communicate with the DNS server using unicast transmissions.

The second MFPs contact (e.g., say "hello" to) the first MFP using the peer-to-peer network. This allows the first MFP to develop a list of the second MFPs that have contacted the first MFP using the peer-to-peer network. The external server contacts (again using unicast transmissions) the first MFP using the first IP address to cause the first MFP to transmit the list of contacted MFPs to the external server. The external server then contacts (again using unicast transmissions) the second MFPs using the list of contacted MFPs (which includes network address information of the second MFPs) to allow the external server to configure the second MFPs.

These and other features are described in, or are apparent from, the following detailed description.

BRIEF DESCRIPTION OF THE DRAWINGS

Various exemplary embodiments of the systems and methods are described in detail below, with reference to the attached drawing figures, in which.

DETAILED DESCRIPTION

Figure 1:
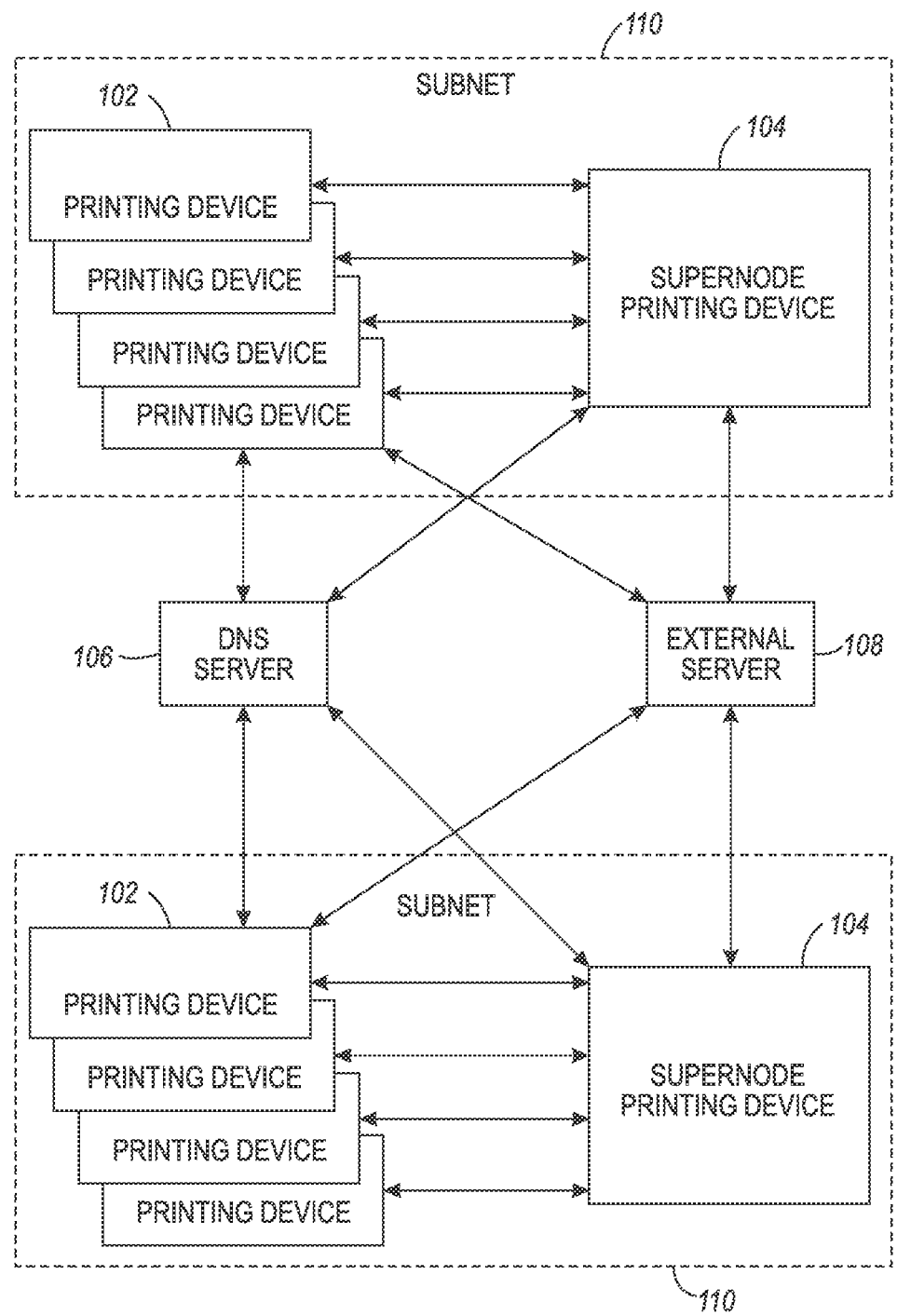
FIG. 1 is a schematic diagram illustrating systems herein.

As mentioned above, common limitations of existing network discovery methods include excessive network traffic caused by broadcast or multicast messages and/or the scope of a broadcast message being limited to local subnet. Therefore, this disclosure presents methods and systems in which a fleet of networked Multi-Function Printers (MFPs) can be discovered by an external server using only peer-to-peer network traffic, without the need for separate servers in the subnet of the peer-to-peer network. Further, such MFPs are made available to an external server.

More specifically, this disclosure presents network discovery methods and systems that discover MFPs across subnets, discover information that includes device properties (including but not limited to: IP address/hostname, unique ID, services, etc.), direct communications (peer-to-peer), avoid the use of multicast or broadcast packets (thereby minimizing network traffic), require only minimal initial setup, and are robust and adaptable to network topology changes. The systems and methods herein include an architecture that allows for device-native discovery services, and enabling technology for fleet-based security and management services on the MFP.

With systems and methods herein a user or administrator can designate multiple MFPs as rendezvous points and can configure their DNS server to indicate these MFPs as rendezvous points, potentially using well-known names. All the MFPs contact the DNS server, send a unicast "Hello" (or other handshake transmission) to the MFPs serving as rendezvous points, and the rendezvous points compile a list of MFPs. This list is made available to the external server and enables the server to retrieve configuration data, or perform other operations, based on commands from the external server.

In the specific implementation, the external server can be, for example, a server managing anti-virus software, configuration settings, data settings, etc., on a fleet of endpoint devices. The external server can then, at a system administrator request, configure each MFP and retrieve machine configuration data using less network intensive unicast transmissions. Thus, the systems and methods herein avoid the need to utilize a server on each subnet, by allowing one of the printers to establish peer-to-peer communications.

The methods and systems herein use a MFP as a rendezvous point for all MFPs via DNS. The MFP rendezvous points are sometimes referred to as "supernodes" herein. While the supernodes are sometimes referred to herein as MFPs, they can be any form of printing device, and other nodes within each network (or subnet) may also be MFPs (but do not need to be). The supernodes use well-known supernode host names (configured in DNS) that are available to other MFPs and servers. The supernode host names allow other MFPs and other devices to find the supernode. With systems and methods herein, all MFPs say "hello" to at least one supernode when they power on and periodically afterwards. Each supernode collects a list of MFPs and their properties that have said "hello" to the supernode. A client to the discovery service provided by such systems and methods can query the supernode to obtain list of compiled information about each discovered MFP.

FIG. 1 illustrates multiple subnets 110 that contain printing devices 102, 104 (but do not need dedicated servers). Subnets 110 are used here as an example, but items 110 also represent any full or partial network, and the term "subnet" is used herein to represent all such items. As shown in FIG. 1, the systems and methods herein utilize at least one of the printers in each subnet 110 as a supernode 104 (note that each subnet 110 does not require its own supernode 104, and the drawing merely shows that each subnet 110 can have its own supernode 104). At some point in its operating cycle (such as during power up) the supernode 104 contacts a DNS server 106 that is external to the subnets 110 and requests an IP address. The IP address supplied by the DNS server 106 becomes the IP address of the supernode 104. In addition to serving the function as a supernode, the printer 104 retains all of its other capabilities (printing, faxing, scanning, copying, etc.).

The other printers 102 that are on the same network or subnet as the supernode 104 contact the DNS server 106 at some point during their operating cycle (again, such as during power up) to request the IP address of the supernode 104. After the DNS server 106 supplies the supernode IP address to each of the individual printers 102, those printers 102 contact the supernode 104 using a unicast transmission. For example, each printer 102 can send a "hello" unicast transmission to the supernode 104 to advise a supernode 104 that the printer 102 is connected to the supernode's 104 local network (or subnet) and is available to perform printing and other operations.

The supernode 104 compiles a list of MFPs that have provided the unicast transmission. The external server 108 contacts the DNS server to find the supernode's IP address. Then, the external server 108 contacts the supernode 104 using a unicast transmission to configure the supernode 104. Further, the external server 108 directly contacts the other printers 102 using a unicast transmission to also configure the other printers 102.

Because the external server 108 uses unicast transmissions to communicate with the supernode 104 and the other printers 102, and the supernode uses peer-to-peer communication directed packets (not broadcast communications) to communicate with the other printers 102, network traffic associated with the discovery of such devices is substantially decreased.

Thus, as shown in FIG. 1, exemplary systems herein include a first computerized printer (such as a first MFP 104), one or more second computerized printers (such as second MFPs 102) connected to each other and to the first MFP 104 by a peer-to-peer network, and an external computerized device (such as a external server 108 which, as mentioned above, can be a configuration server, etc.) that is connected to a WAN outside the peer-to-peer network.

In this system, the first MFP 104 acquires a first network (e.g., IP) address from a first (e.g., DNS) server using unicast (non-broadcast) transmissions. The second MFPs 102 and the external server 108 also acquire the first IP address from the DNS server 106 after the first MFP 104 acquires the first IP address. The second MFPs 102 and the external server 108 similarly communicate with the DNS server 106 using unicast transmissions.

The second MFPs 102 contact (e.g., say "hello" to) the first MFP 104 using the peer-to-peer network. This allows the first MFP 104 to develop a list of the second MFPs 102 that have contacted the first MFP 104 using the peer-to-peer network. The external server 108 contacts (again using unicast transmissions) the first MFP 104 using the first IP address to cause the first MFP 104 to transmit the list of contacted MFPs to the external server 108. The external server 108 then contacts (again using unicast transmissions) the second MFPs 102 using the list of contacted MFPs (which includes network address information of the second MFPs 102) to allow the external server 108 to configure the second MFPs 102. The external server 108 can directly contact each individual MFP 102.

Figure 2:
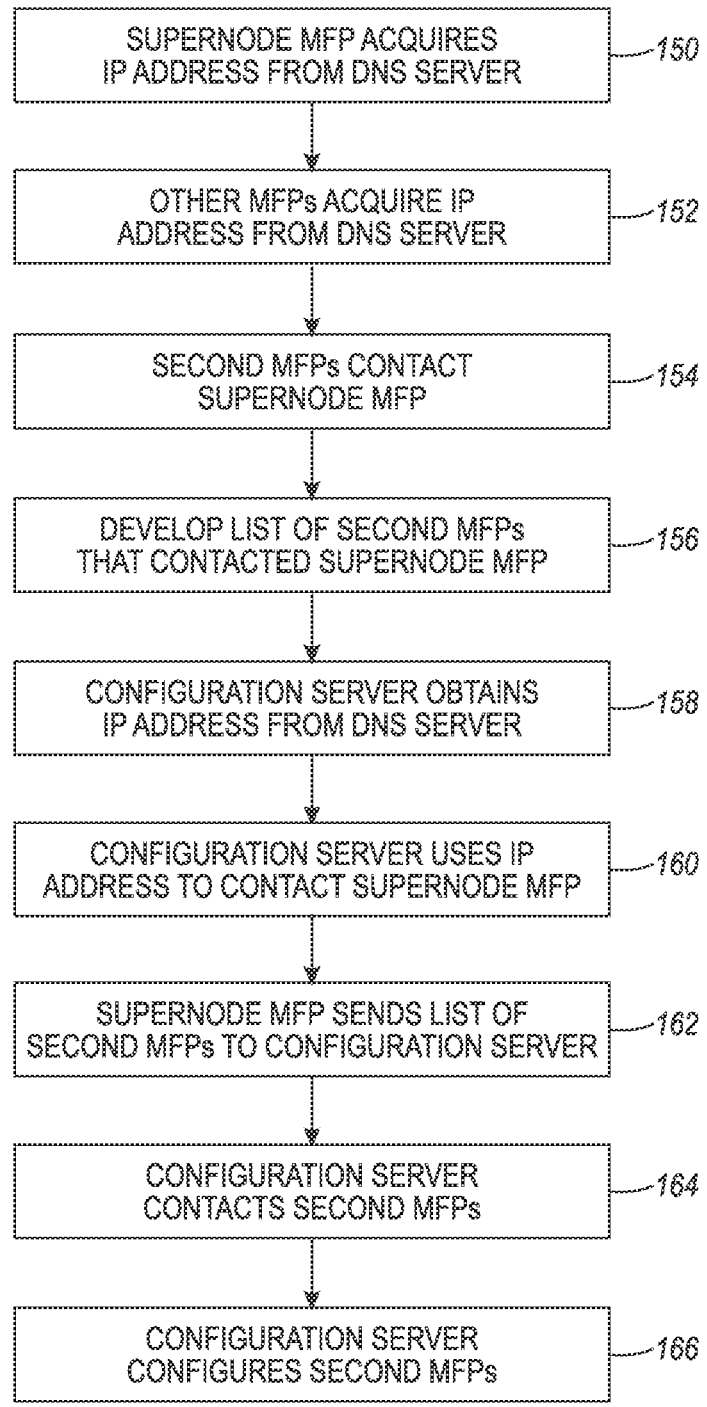
FIG. 2 is a flow diagram of methods herein.

FIG. 2 is flowchart illustrating an exemplary method herein. Exemplary methods herein begin in item 150 with a first computerized printer (e.g., a multi-function printer (MFP) or "supernode" MFP) acquiring a first Internet Protocol (IP) address from a first server (e.g., a Device Name System (DNS) server) using unicast transmissions (non-broadcast, non-multicast transmissions). Then, in item 152, one or more second computerized printers (e.g., second MFPs) acquire the first IP address from the DNS server after the first MFP acquires the first IP address. As noted above, the second MFPs are connected to the first MFP by a peer-to-peer network, and the second MFPs communicate with the DNS server using unicast transmissions. Unicast transmissions again comprise messages sent to a single network destination identified by a unique address, and communications on the peer-to-peer network therefore comprise one-to-one communications (e.g., direct packet communications).

Additionally, in item 154, the second MFPs contact (transmit a "hello" to) the first MFP using the peer-to-peer network. This allows the first MFP to develop a list of second MFPs that have contacted the first MFP using the peer-to-peer network (after the first MFP acquires the first IP address) in item 156. The list of contacted MFPs includes network address information of the second MFPs.

Further, in item 158, a first computerized device (e.g., a configuration server) acquires the first IP address from the DNS server after the first MFP acquires the first IP address. The configuration server and DNS server are connected to a wide area network (WAN, such as the Internet) outside the peer-to-peer network, and the configuration server communicates with the DNS server using unicast transmissions.

These methods continue in item 160 where the configuration server contacts the first MFP using the first IP address to cause the first MFP to transmit the list of contacted MFPs to the configuration server (in item 162). In item 160, the configuration server communicates with the first MFP using unicast transmissions. The configuration server can then contact the second MFPs using the list of contacted MFPs in item 164 to allow the configuration server to obtain configuration information from, and to configure, the second MFPs in item 166. The configuration server also communicates with the second MFPs using unicast transmissions in item 164.

Figure 3:
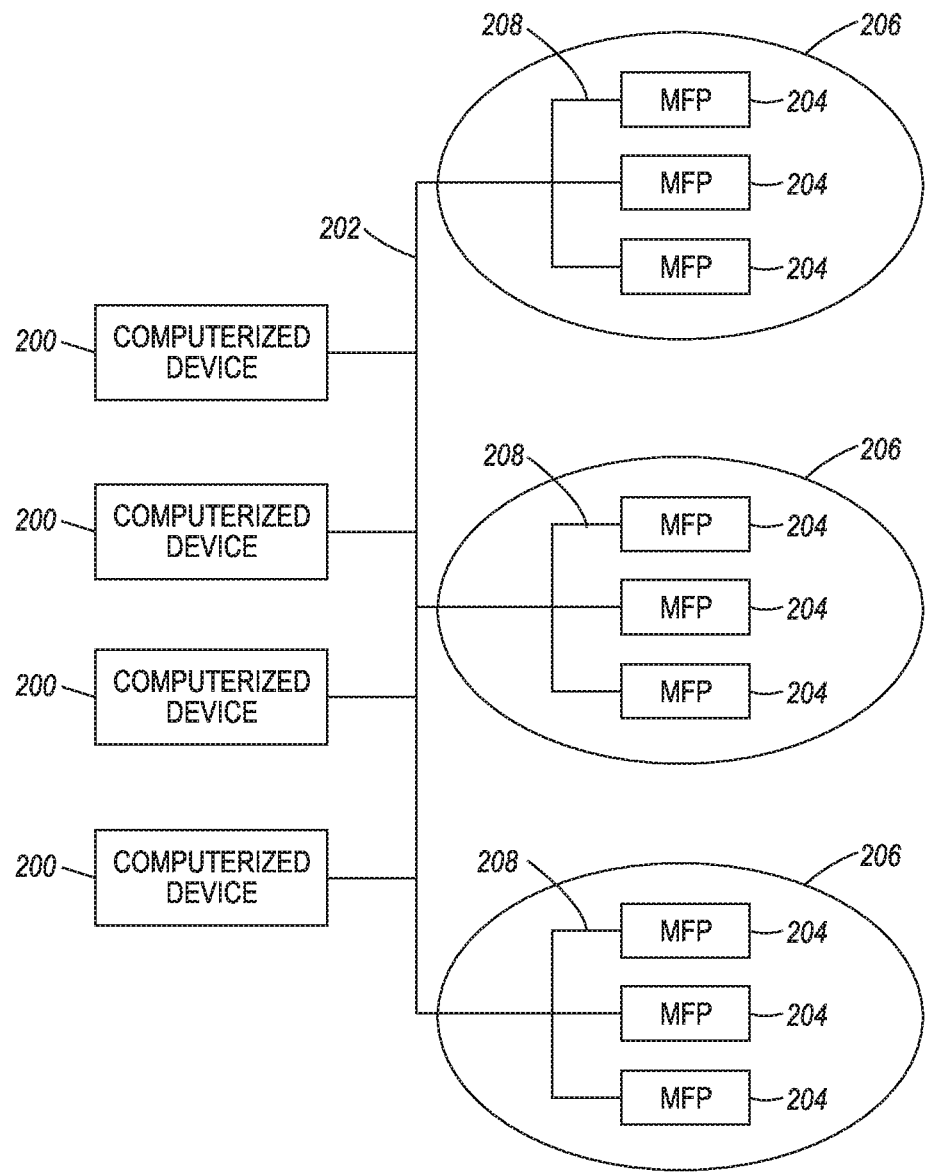
FIG. 3 is a schematic diagram illustrating systems herein.

As shown in FIG. 3, exemplary system embodiments herein include various computerized devices 200, 204 located at various different physical locations 206. The computerized devices 200, 204 can include print servers, printers, personal computers, etc., and are in communication (operatively connected to one another) by way of a local or wide area (wired or wireless) network 202.

In FIG. 3, the first MFP 104 and second MFPs 102 are illustrated generically as MFPs 204, the peer-to-peer network connecting the MFPs 204 is illustrated as item 208, the DNS server 106 and external server 108 are shown generically as items 200, and the WAN (e.g., Internet) that is outside the peer-to-peer network 208 is illustrated as item 202. As would be understood by those ordinarily skilled in the art, any of the devices could be located within a cloud storage environment, any of the devices could be virtual devices, etc., and the illustrations provided are intentionally simplified to focus the reader on the salient features of the methods and systems herein.

Figure 4:
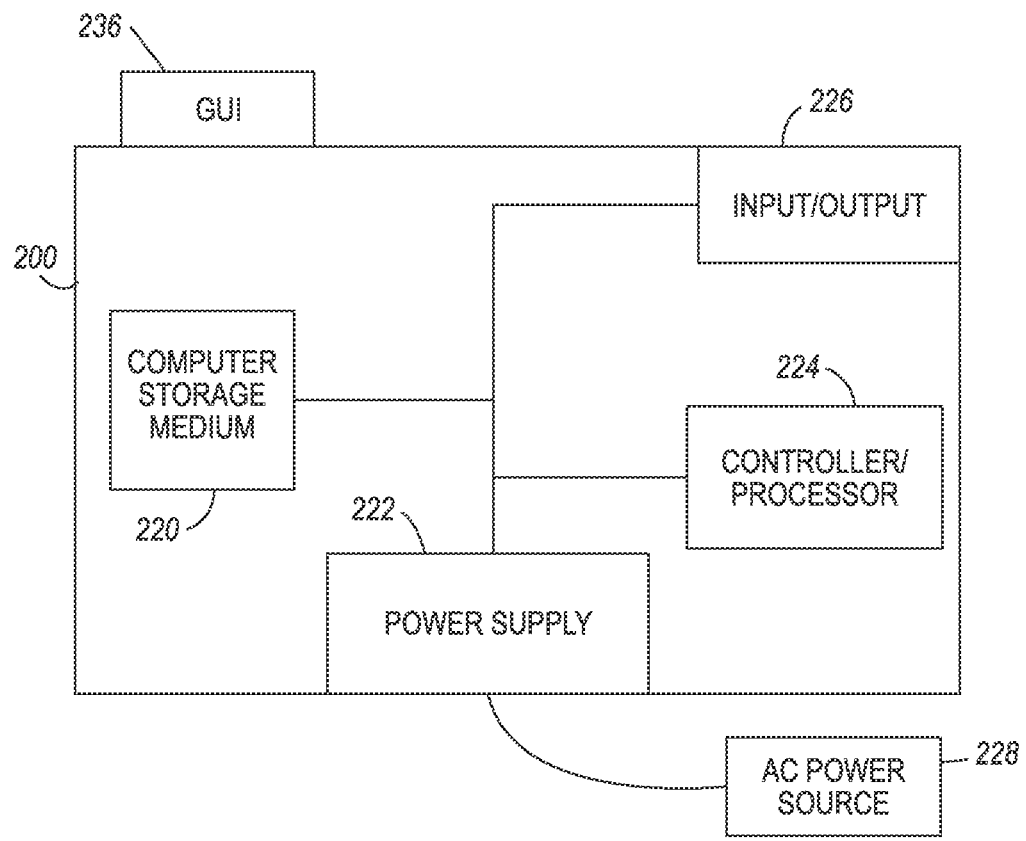
FIG. 4 is a schematic diagram illustrating devices herein.

FIG. 4 illustrates one of the computerized devices 200 discussed above, which can be used with embodiments herein and can comprise, for example, a DNS server, a configuration server, a print server, a personal computer, a portable computing device, etc. The computerized device 200 includes a controller/processor 224 and a communications port (input/output) 226 operatively connected to the processor 224 and to the computerized network 202 external to the computerized device 200. Also, the computerized device 200 can include at least one accessory functional component, such as a graphic user interface assembly 236 that also operate on the power supplied from the external power source 228 (through the power supply 222).

The input/output device 226 is used for communications to and from the computerized device 200. The processor 224 controls the various actions of the computerized device. A non-transitory computer storage medium device 220 (which can be optical, magnetic, capacitor based, etc.) is readable by the processor 224 and stores instructions that the processor 224 executes to allow the computerized device to perform its various functions, such as those described herein. Thus, as shown in FIG. 4, a body housing 200 has one or more functional components that operate on power supplied from the alternating current (AC) 228 by the power supply 222. The power supply 222 can comprise a power storage element (e.g., a battery) and connects to an external alternating current power source 228 and converts the external power into the type of power needed by the various components.

Figure 5:
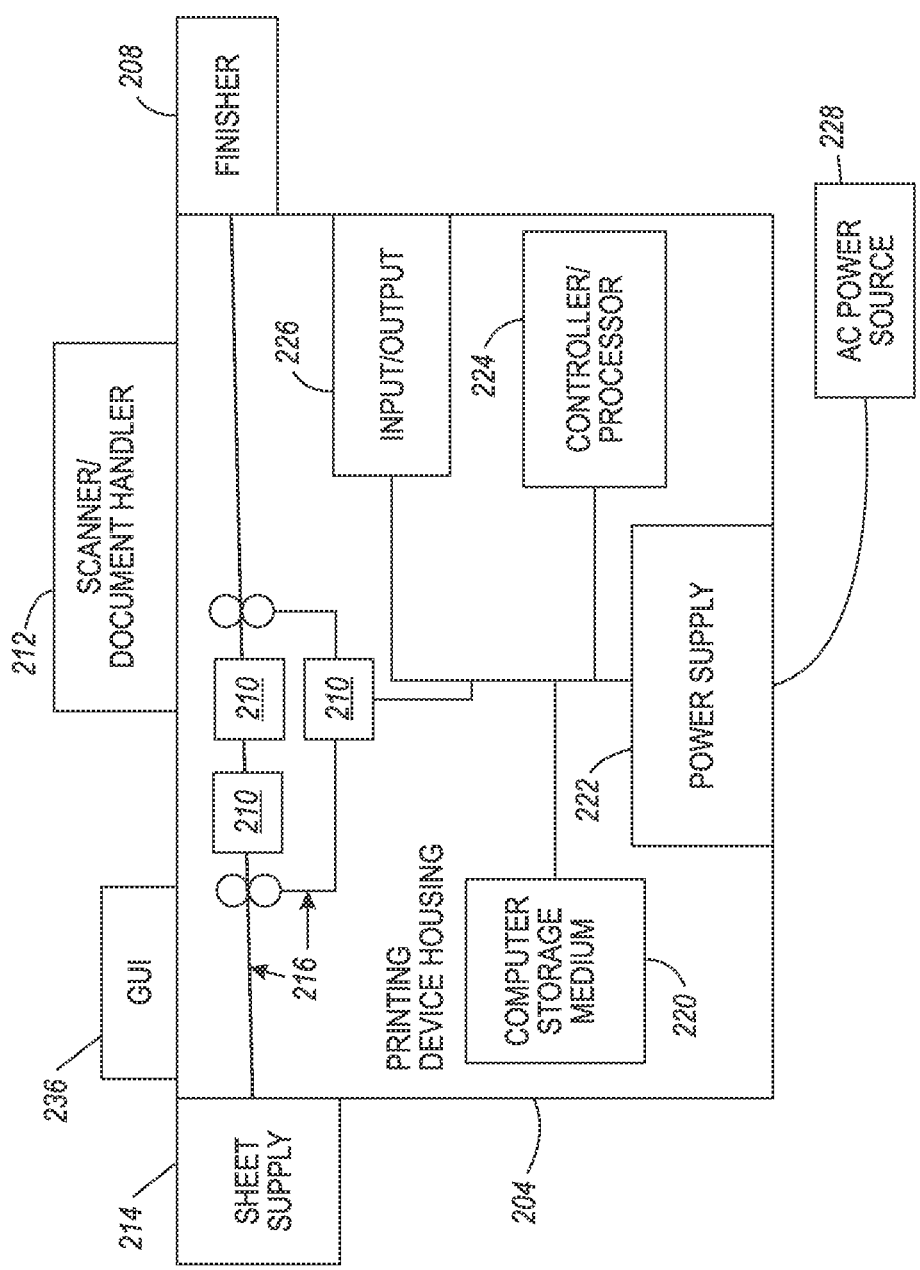
FIG. 5 is a schematic diagram illustrating devices herein.

FIG. 5 illustrates a computerized device that is one of the printers 204 discussed above, which can comprise, for example, a printer, copier, multi-function machine, multi-function device (MFD), etc. The printer 204 includes many of the components mentioned above and at least one marking device (printing engines) 210 operatively connected to the processor 224, a media path 216 positioned to supply sheets of media from a sheet supply 214 to the marking device(s) 210, etc. After receiving various markings from the printing engine(s), the sheets of media can optionally pass to a finisher 208 which can fold, staple, sort, etc., the various printed sheets. Also, the printer 204 can include at least one accessory functional component (such as a scanner/document handler 212, etc.) that also operates on the power supplied from the external power source 228 (through the power supply 222).

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printer as used herein encompasses any apparatus, such as a digital copier, bookmaking machine, facsimile machine, multi-function machine, etc., which performs a print outputting function for any purpose. The details of printers, printing engines, etc., are well-known by those ordinarily skilled in the art. The embodiments herein can encompass embodiments that print in color, monochrome, or handle color or monochrome image data. All foregoing embodiments are specifically applicable to electrostatographic and/or xerographic machines and/or processes.

In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the embodiments herein cannot be implied or imported from any above example as limitations to any particular order, number, position, size, shape, angle, color, or material.

What is claimed is:

1. A system comprising:
   a first printer acquiring a first network address from a first server using only unicast transmissions, said unicast transmissions being distinct from broadcast transmissions and comprising messages sent directly to a single network destination identified by a unique address;
   a peer-to-peer network connected to said first printer;
   a second printer connected to said peer-to-peer network, said second printer acquiring said first network address from said first server after said first printer acquires said first network address, said second printer communicating with said first server using only said unicast transmissions, said second printer contacting said first printer using said peer-to-peer network, said first printer developing a list of contacted printers that have contacted said first printer using only said unicast transmissions in said peer-to-peer network, and said list of contacted printers comprising network address information of said second printer; and
   a first computerized device acquiring said first network address from said first server after said first printer acquires said first network address,
   said first computerized device being outside said peer-to-peer network,
   said first computerized device communicating with said first server using only said unicast transmissions,
   said first computerized device contacting said first printer using said first network address to cause said first printer to transmit said list of contacted printers to said first computerized device,
   said first computerized device communicating with said first printer using only said unicast transmissions,
   said first computerized device contacting said second printer using said network address information of said second printer within said list of contacted printers to cause said first computerized device to configure said second printer, and
   said first computerized device communicating with said second printer using only said unicast transmissions.

2. The system according to claim 1, said second printer being on said list of contacted printers.

3. The system according to claim 1, said list of contacted printers being developed after said first printer acquires said first network address.

4. The system according to claim 1, communications on said peer-to-peer network comprising direct packet communications.

5. A system comprising:
   a first multi-function printer (MFP) acquiring a first Internet Protocol (IP) address from a Device Name System (DNS) server using only unicast transmissions;
   a peer-to-peer network connected to said first MFP;
   a second MFP connected to said peer-to-peer network, said second MFP acquiring said first IP address from said DNS server after said first MFP acquires said first IP address, said second MFP communicating with said DNS server using only said unicast transmissions, said unicast transmissions being distinct from broadcast transmissions and comprising messages sent directly to a single network destination identified by a unique address, said second MFP contacting said first MFP using said peer-to-peer network, said first MFP developing a list of contacted MFPs that have contacted said first MFP using only said unicast transmissions in said peer-to-peer network, and said list of contacted MFPs comprising network address information of said second MFP; and
   a configuration server acquiring said first IP address from said DNS server after said first MFP acquires said first IP address,
   said configuration server being outside said peer-to-peer network,
   said configuration server communicating with said DNS server using only said unicast transmissions,
   said configuration server contacting said first MFP using said first IP address to cause said first MFP to transmit said list of contacted MFPs to said configuration server,
   said configuration server communicating with said first MFP using only said unicast transmissions,
   said configuration server contacting said second MFP using said network address information of said second MFP within said list of contacted MFPs to cause said configuration server to configure said second MFP, and
   said configuration server communicating with said second MFP using only said unicast transmissions.

6. The system according to claim 5, said second MFP being on said list of contacted MFPs.

7. The system according to claim 5, said list of contacted MFPs being developed after said first MFP acquires said first IP address.

8. The system according to claim 5, communications on said peer-to-peer network comprising direct packet communications.

9. A method comprising:
   acquiring, by a first printer, a first network address from a first server using only unicast transmissions;
   acquiring said first network address from said first server by a second printer after said first printer acquires said first network address, said second printer being connected to said first printer by a peer-to-peer network, and said second printer communicating with said first server using only said unicast transmissions, said unicast transmissions being distinct from broadcast transmissions and comprising messages sent directly to a single network destination identified by a unique address;
   contacting said first printer by said second printer, using said peer-to-peer network;
   developing, by said first printer, a list of contacted printers that have contacted said first printer using only said unicast transmissions in said peer-to-peer network, and said list of contacted printers comprising network address information of said second printer;
   acquiring said first network address from said first server by a first computerized device after said first printer acquires said first network address, said first computerized device being outside said peer-to-peer network, and said first computerized device communicating with said first server using only said unicast transmissions;
   contacting said first printer by said first computerized device using said first network address to cause said first printer to transmit said list of contacted printers to said first computerized device, said first computerized device communicating with said first printer using only said unicast transmissions; and contacting said second printer by said first computerized device using said network address information of said second printer within said list of contacted printers to cause said first computerized device to configure said second printer, said first computerized device communicating with said second printer using only said unicast transmissions.

10. The method according to claim 9, said second printer being on said list of contacted printers.

11. The method according to claim 9, said list of contacted printers being developed after said first printer acquires said first network address.

12. The method according to claim 9, communications on said peer-to-peer network comprising direct packet communications.

13. A method comprising:

acquiring, by a first multi-function printer (MFP), a first Internet Protocol (IP) address from a Device Name System (DNS) server using only unicast transmissions, said unicast transmissions being distinct from broadcast transmissions and comprising messages sent directly to a single network destination identified by a unique address;

acquiring said first IP address from said DNS server by a second MFP after said first MFP acquires said first IP address, said second MFP being connected to said first MFP by a peer-to-peer network, and said second MFP communicating with said DNS server using only unicast transmissions;

contacting said first MFP by said second MFP, using said peer-to-peer network;

developing, by said first MFP, a list of contacted MFPs that have contacted said first MFP using only said unicast transmissions in said peer-to-peer network, and said list of contacted MFPs comprising network address information of said second MFP;

acquiring said first IP address from said DNS server by a configuration server after said first MFP acquires said first IP address, said configuration server being outside said peer-to-peer network, and said configuration server communicating with said DNS server using only said unicast transmissions;

contacting said first MFP by said configuration server using said first IP address to cause said first MFP to transmit said list of contacted MFPs to said configuration server, said configuration server communicating with said first MFP using only said unicast transmissions; and contacting said second MFP by said configuration server using said network address information of said second MFP within said list of contacted MFPs to cause said configuration server to configure said second MFP, said configuration server communicating with said second MFP using only said unicast transmissions.

14. The method according to claim 13, said second MFP being on said list of contacted MFPs.

15. The method according to claim 13, said list of contacted MFPs being developed after said first MFP acquires said first IP address.

16. The method according to claim 13, communications on said peer-to-peer network comprising direct packet communications.

* * * * *